US00RE41650E

(19) United States
(12) Reissued Patent
Popat

(10) Patent Number: US RE41,650 E
(45) Date of Reissued Patent: Sep. 7, 2010

(54) ASSEMBLY FOR PASSING THROUGH A PRINTER OR COPIER AND SEPARATING OUT INTO INDIVIDUAL PRINTED MEDIA

(75) Inventor: Ghanshyam H. Popat, Richcrest, CA (US)

(73) Assignee: Avery Dennison Corporation, Pasadena, CA (US)

(21) Appl. No.: 11/847,264

(22) Filed: Aug. 29, 2007

Related U.S. Patent Documents

Reissue of:
(64) Patent No.: 5,993,928
Issued: Nov. 30, 1999
Appl. No.: 08/846,421
Filed: Apr. 30, 1997

U.S. Applications:
(63) Continuation-in-part of application No. 08/641,332, filed on Apr. 30, 1996, now Pat. No. 5,997,680.

(51) Int. Cl.
*B32B 3/30* (2006.01)

(52) U.S. Cl. ..... 428/43; 428/47; 428/59; 428/60; 428/77; 428/78; 428/79; 428/81; 428/124; 428/131; 428/192; 428/136; 428/137; 428/156; 428/167; 283/103; 283/105

(58) Field of Classification Search ..... 428/43, 428/77–79, 81, 124, 131, 136, 137, 156, 428/167, 47, 59, 60, 192; 283/103, 105
See application file for complete search history.

(56) References Cited

U.S. PATENT DOCUMENTS 3,338,199 A * 8/1967 Taylor ..... 413/13
3,790,744 A * 2/1974 Bowen ..... 219/121.69
3,896,246 A 7/1975 Brady, Jr.
4,005,810 A 2/1977 Porter
3,140,215 A 7/1964 Russell
3,267,780 A * 8/1966 Roth ..... 83/880
3,269,278 A 8/1966 Olstad
3,288,006 A * 11/1966 Erlandson ..... 83/879

(Continued)

FOREIGN PATENT DOCUMENTS

DE 4240825 A1 * 12/1992

(Continued)

OTHER PUBLICATIONS

Information Disclosure Statement filed Jun. 16, 2005 in Application Serial No. 90/007,592, 2 pp.
Patent for which reexamination is requested filed Jun. 16, 2005 in Application Serial No. 90/007,592, 6 pp.
Request for Ex Parte Reexamination by Third party filed Jun. 16, 2005 in Application Serial No. 90/007,592, 19 pp.

(Continued)

*Primary Examiner*—Alexander Thomas
(74) *Attorney, Agent, or Firm*—Douglas N. Larson; Intellectual Property Law Office of Joel Voelzke, APC

(57) ABSTRACT

Two pairs of parallel substantial-cut [or scored] lines extend the length of a card stock sheet and short through-cut lines extend between each of the pairs to define two columns of business card blanks on the sheet. The sheet is passed through a laser or ink jet printer or copier, printing the desired identifying or other indicia on the blanks. The blanks are then separated along the substantial-cut and through-cut lines and the waste sheet portions at the ends, sides, and between the columns are disposed of. The business cards separate cleanly along the substantial-cut lines, superior to the microperforated business card separation lines. Even with the substantial-cut and full-cut lines, the card stock sheets have enough integrity to reliably pass through the printer without breaking apart. To make for a cleaner break (or business card edge) along the substantial-cut lines, the substantial-cut lines can be made by [scoring] *cutting* part way into the sheet on both opposing sheet faces. Also, cleaner break lines can be provided by first subjecting the sheet to a process, such as supercalendering, which makes the sheet more brittle and/or densifies the paper fibers.

185 Claims, 3 Drawing Sheets

U.S. PATENT DOCUMENTS

| | | | | | |
|---|---|---|---|---|---|
| 4,048,736 | A | | 9/1977 | Castleman et al. | |
| 4,173,293 | A | | 11/1979 | Hamisch, Jr. et al. | |
| 4,176,572 | A | * | 12/1979 | Pennington | 83/862 |
| 4,264,662 | A | | 4/1981 | Taylor et al. | |
| 4,380,564 | A | | 4/1983 | Cancio et al. | |
| 4,428,857 | A | | 1/1984 | Taylor et al. | |
| 4,457,199 | A | * | 7/1984 | Corcoran | 83/862 |
| 4,465,729 | A | | 8/1984 | Cancio et al. | |
| 4,494,435 | A | * | 1/1985 | Lindsay | 83/880 |
| 4,524,894 | A | * | 6/1985 | Leblond | 225/2 |
| 4,732,069 | A | | 3/1988 | Wood et al. | |
| 4,833,122 | A | | 5/1989 | Doll et al. | |
| 4,863,772 | A | | 9/1989 | Cross | |
| 4,979,612 | A | * | 12/1990 | Melbye | 206/216 |
| 5,001,106 | A | | 3/1991 | Egashira et al. | |
| 5,031,939 | A | | 7/1991 | Webendorfer et al. | |
| 5,132,915 | A | * | 7/1992 | Goodman | 700/233 |
| 5,135,789 | A | | 8/1992 | Schmidt | |
| 5,160,573 | A | * | 11/1992 | Takagi et al. | 156/510 |
| 5,178,419 | A | | 1/1993 | Bolnick et al. | |
| 5,198,275 | A | * | 3/1993 | Klein | 428/43 |
| 5,220,858 | A | * | 6/1993 | Allen et al. | 83/880 |
| 5,238,269 | A | * | 8/1993 | Levine | 281/2 |
| 5,262,216 | A | * | 11/1993 | Popat et al. | 428/41.3 |
| 5,275,686 | A | * | 1/1994 | Schaus et al. | 117/93 |
| 5,318,325 | A | | 6/1994 | Ipsen | |
| 5,340,427 | A | | 8/1994 | Cusack et al. | |
| 5,366,250 | A | | 11/1994 | Sunabe | |
| 5,389,414 | A | | 2/1995 | Popat | |
| 5,398,580 | A | | 3/1995 | Gerhardt et al. | |
| 5,407,718 | A | * | 4/1995 | Popat et al. | 428/41.5 |
| 5,413,532 | A | | 5/1995 | Raby | |
| 5,462,488 | A | | 10/1995 | McKillip | |
| 5,487,568 | A | | 1/1996 | Ipsen | |
| 5,560,966 | A | | 10/1996 | Kishimoto et al. | |
| 5,571,587 | A | * | 11/1996 | Bishop et al. | 428/43 |
| 5,632,842 | A | | 5/1997 | Oliver et al. | |
| 5,702,789 | A | | 12/1997 | Fernandez-Kirchberger et al. | |
| 5,709,913 | A | | 1/1998 | Andersen et al. | |
| 5,727,817 | A | | 3/1998 | Kraige | |
| 5,735,453 | A | | 4/1998 | Gick et al. | |
| 5,811,371 | A | | 9/1998 | Egashira et al. | |
| 5,853,837 | A | | 12/1998 | Popat | |
| 5,914,165 | A | | 6/1999 | Freedman | |
| 5,947,368 | A | | 9/1999 | Thresher et al. | |
| 5,997,680 | A | | 12/1999 | Popat | |
| 5,997,683 | A | | 12/1999 | Popat | |
| 6,162,517 | A | | 12/2000 | Oshima et al. | |
| 6,173,649 | B1 | | 1/2001 | Onishi | |
| 6,380,132 | B1 | | 4/2002 | Mihara et al. | |
| 6,617,122 | B1 | | 9/2003 | Hayden et al. | |
| 2001/0003609 | A1 | | 6/2001 | Takada et al. | |

FOREIGN PATENT DOCUMENTS

| | | | | |
|---|---|---|---|---|
| DE | 4240825 | | | 6/1994 |
| DE | 1996-19519584 | | | 12/1996 |
| DE | 19741563 | | | 3/1998 |
| DE | 29805481 | | | 9/1998 |
| DE | 29907361 | | | 3/2000 |
| DE | 19945254 | | | 8/2001 |
| DE | 69909841 | | | 5/2004 |
| EP | 0377289 | A2 | * | 7/1990 |
| EP | 0688006 | A1 | * | 4/1995 |
| EP | 0987670 | | | 3/2000 |
| EP | 2000-0987195 | | | 3/2000 |
| WO | WO 88/07737 | | * | 3/1988 |
| WO | WO 94/20944 | | * | 3/1994 |
| WO | WO-1995-34879 | | | 12/1995 |
| WO | WO-2000-16978 | | | 3/2000 |
| WO | WO-2000-32412 | | | 6/2000 |

OTHER PUBLICATIONS

Information Disclosure Statement filed Nov. 18, 2005 in Application Serial No. 90/007,592, 5pp.
Supplemental Information Disclosure Statement filed Nov. 30, 2005 in Application Serial No. 90/007,592, 4 pp.
Supplemental Information Disclosure Statement filed Dec. 1, 2005 in Application Serial No. 90/007,592, 5 pp.
Supplemental Information Disclosure Statement filed Jan. 18, 2006 in Application Serial No. 90/007,592, 4 pp.
Office Action dated Mar. 1, 2006 in Application Serial No. 90/007,592, 31 pp.
Supplemental Information Disclosure Statement filed Mar. 8, 2006 in Application Serial No. 90/007,592, 4 pp.
Supplemental Information Disclosure Statement filed Mar. 21, 2006 in Application Serial No. 90/007,592, 4 pp.
Ex Parte Reexamination Examiner Interview Summary Record filed May 9, 2006 in Application Serial No. 90/007, 592, 5 pp.
Supplemental Information Disclosure Statement filed May 16, 2005 in Application Serial No. 90/007,592, 3 pp.
Office Action in Ex Parte Reexamination dated Jan. 25, 2007 in Application Serial No. 90/007,592, 40 pp.
Ex Parte Reexamination Examiner filed Mar. 21, 2007 in Application Serial No. 90/007,592, 17 pp.
Interview Summary Record filed Mar. 26, 2007 in Application Serial No. 90/007,592, 3 pp.
Ex Parte Reexamination Certificate issued Jan. 8, 2008 in Application Serial No. 90/007,592, 7 pp.
Information Disclosure Statement filed Jun. 16, 2005 in Application Serial No. 90/007,590, 2 pp.
Patent for which reexamination is requested filed Jun. 16, 2005 in Application Serial No. 90/007,590, 6 pp.
Request for Ex Parte Reexamination by Third Party filed Jun. 16, 2005 in Application Serial No. 90/007,590, 15 pp.
Information Disclosure Statement filed Nov. 18, 2005 in Application Serial No. 90/007.590, 5 pp.
Supplemental Information Disclosure Statement filed Nov. 30, 2005 in Application Serial No. 90/007.590, 4 pp.
Supplemental Information Disclosure Statement filed Dec. 1, 2005 in Application Serial No. 90/007.590, 9 pp.
Supplemental Information Disclosure Statement filed Jan. 18, 2006 in Application Serial No. 90/007.590, 4 pp.
Non–final Office Action dated Mar. 14, 2006 in Application Serial No. 90/007.,90, 43 pp.
Supplemental Information Disclosure Statement filed May 16, 2006 in Application Serial No. 90/007.590, 2 pp.
Ex Parte Reexamination Examiner Interview Summary filed Nov. 14, 2006 in Application Serial No. 90/007.,90, 4 pp.
Interview Summary Record filed Dec. 26, 2006 in Application Serial No. 90/007,590, 4 pp.
Non–final Office Action Apr. 5, 2007 in Application Serial No. 90/007,590, 111 pp.
Ex Parte Reexamination Examiner Interview Summary filed May 14, 2007 in Application Serial No. 90/007,590, 111 pp.
Interview Summary Record filed Jun. 7, 2006 in Application Serial No. 90/007,590, 4 pp.
Non–final Office Action Jul. 15, 2008 in Application Serial No. 90/007,590, 12 pp.
Final Office Action Apr. 17, 2009 in Application Serial No. 90/007,590, 13 pp.

* cited by examiner

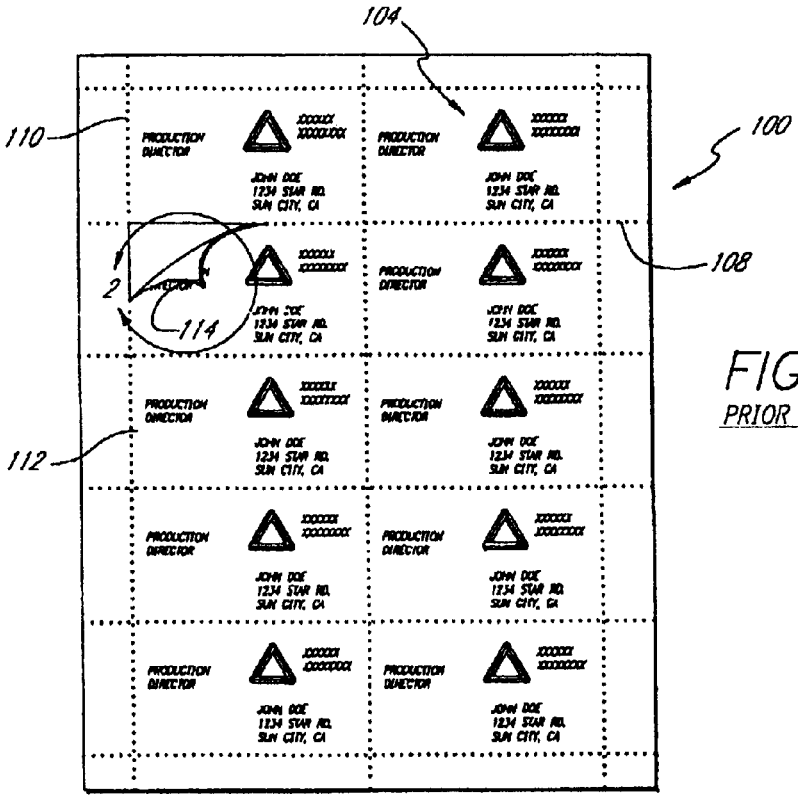
FIG. 1
PRIOR ART
FIG. 2
PRIOR ART
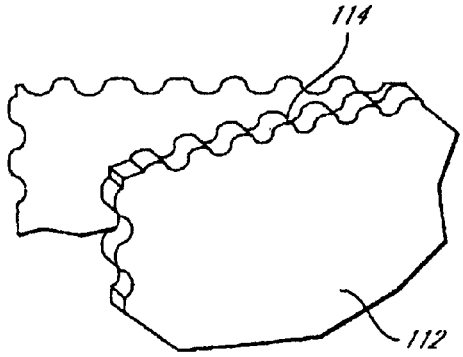
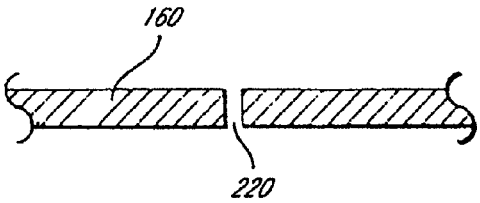
FIG. 5
FIG. 6
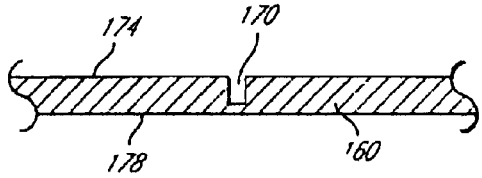

ASSEMBLY FOR PASSING THROUGH A PRINTER OR COPIER AND SEPARATING OUT INTO INDIVIDUAL PRINTED MEDIA

Matter enclosed in heavy brackets [ ] appears in the original patent but forms no part of this reissue specification; matter printed in italics indicates the additions made by reissue.

CROSS-REFERENCE TO RELATED APPLICATION

This is a continuation-in-part of application Ser. No. 08/641,332, filed Apr. 30, 1996 now U.S. Pat. No. 5,997,680, the entire contents of which are hereby incorporated by reference.

BACKGROUND OF THE INVENTION

The present invention relates to methods of forming business cards and to the constructions of sheets of blank business cards for passing through laser or ink jet printers or copiers.

A sheet of business cards as known in the prior art is shown in FIG. 1 generally at 100. Sheet 100 is a drawing of the sheet after having passed through a laser or ink jet printer and with the desired indicia 104 printed thereon. Sheet 100 was formed with a gridwork of horizontal and vertical microperforation lines 108, 110 extending the full length and width of the sheet. The microperforations are typically more than fifty per inch.

Although the microperforations are thereby small and close together, when the cards 112, after the printing operation thereon, are separated from one another by tearing along the lines, perfectly clean cuts or edges do not result. Rather, the edges 114 are slightly fuzzy as shown in the enlarged view of FIG. 2. These fuzzy edges 114 give the card 112 a less professional look than clean knife cut edges and in certain uses are unacceptable. Currently, business cards have substantially clean edges as they are manufactured by Quick printers (such as KINKOS or PIP). However, the laser and ink jet card products including laser and ink jet card products do not provide clean edges, similar to the main stream business cards.

SUMMARY OF THE INVENTION

Directed to remedying problems in the prior art, disclosed herein is an improved business card sheet assembly. The assembly includes, according to one preferred embodiment, a card stock sheet having two parallel pairs of substantial-cut lines extending the length of the sheet and engaging the sheet at both ends thereof. Instead of paper sheets, rolls, fan fold or other print media can be used. The substantial-cut lines extend about 90% through the thickness of the sheet from the front towards the back surface. The sheet is then die cut with short (through-cut) lines extending widthwise between the lines of each pair, or vice versa. The substantial-cut and through-cut lines form on the sheet two columns of business card blanks, with paper waste strips at the side (and end) margins and between the columns. The sheet is then passed through desk top printers, such as laser or ink jet printers or copiers, and the desired indicia is printed on each of the blanks. The printed card blanks are then separated from one another along the substantial-cut and through-cut lines. The borders or edges of the resulting cards are cleaner, superior to the prior art microperforated cards.

To provide for an even cleaner card edge where it was separated along the substantial-cut lines, the substantial-cut lines can be formed by [scoring] *cutting* the sheet part way on both faces of the sheet. Thereby, the intact portion of the sheet along these lines will be at the middle (approximately ten or twenty percent) thickness of the sheet. After separation, the torn fibers, being in the middle of the sheet, will be less visible. Also, this construction allows for greater manufacturing control of the formation of the substantial-cut lines to accommodate for different thickness of the paper, depending on where it is taken from the paper roll.

Additionally, a cleaner card edge can be provided by first making the paper more brittle, by densifying its fibers. Preferably, this is done by supercalendering the paper. Supercalendering is a process that has been used by paper manufacturers for many years to produce relatively denser and thinner paper. Instead of supercalendering, the paper can be done by subjecting the paper to chemical or radiation treatments, or other ways as would be apparent to those skilled in the art from this disclosure.

Other objects and advantages of the present invention will become more apparent to those persons having ordinary skill in the art to which the present invention pertains from the foregoing description taken in conjunction with the accompanying drawings.

BRIEF DESCRIPTION OF THE DRAWINGS

FIG. 1 is a front view of a sheet of business cards of the prior art, after having been printed, and showing one of them being torn away along its microperforation lines;

FIG. 2 is an enlarged view taken on circle 2 of FIG. 1;

FIG. 5 is an enlarged view taken on line 5—5 of FIG. 4;

FIG. 6 is an enlarged view taken on line 6—6 of FIG. 4;

DETAILED DESCRIPTION OF PREFERRED EMBODIMENTS OF THE INVENTION

Figure 7:
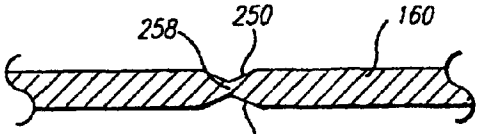
FIG. 7 is a view similar to FIG. 6 showing an alternative embodiment of the present invention.
Figure 3:
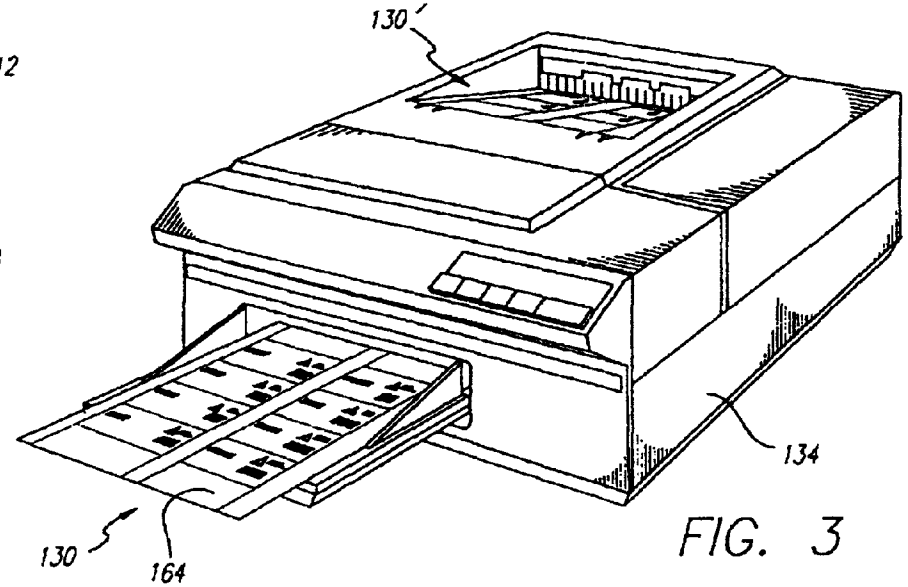
FIG. 3 is a perspective view showing sheet assemblies of the present invention passing through a printer.

Referring to FIGS. 3–6, a sheet assembly of the present invention is shown generally at 130. The sheet assembly 130 is shown at the bottom left of FIG. 3 before entering the printer 134 and as it would be purchased by the user (after removal from its packaging (not shown)). The sheet assembly 130' is shown in the upper right of FIG. 3 and (in isolation) in FIG. 4 after having passed through the printer 134, and with the identifying indicia shown generally at 140 printed thereon. As an example, the indicia 140 can include the individual's name 142, address 144, title 146, company name 148 and company logo 150. It can additionally or alternatively include other information such as telephone and facsimile numbers and/or E-mail addresses as desired. The printer 134 can be a laser or ink jet printer, or photo-copier.

The sheet assembly includes a sheet of paper 160 such as ten mil thick cardstock available from Simpson Paper Mill in Pomona, Calif. The thickness of the sheet of paper 160 is preferably between seven and twenty mils. A pattern of sheet portions or cards 164 is defined on the sheet by a pattern of lines. The sheet portions 164 are preferably rectangular, but other shapes are within the scope of the invention. For example, the sheet 160 can have dimensions of 8½×11 inches and each of the portions 164 can have the dimensions of a traditional business card (e.g., two by three and a half inches).

*The sheet 160 may be a print media, and the print media may be a sheet of paper. This sheet of paper may be bonded or laminated with another paper, film or foil. Further, the sheet may have been subjected to a process making the sheet more brittle. The process may have been a supercalendering process, a chemical process, an irradiation process, an irradiation process which uses ultraviolet radiation or an irradiation process which uses gamma radiation. The process may be applied before, after or simultaneously with the formation of the substantial-cut lines.*

Alternatively, the sheet 160 can be supercalendered paper material. It can have a thickness of between one mil to ten mil plus, and preferably between six and thirteen mil. The reason for this somewhat broad thickness range is that some printers, such as ink jet printers, cannot handle heavier or thicker material so that card stock of six, seven or eight mils is needed. On the other hand, other copiers and printers, such as laser printers, can handle thicker materials. The supercalendaring process compresses the paper so that its thickness is reduced by between two and forty percent, for example.

The weight of the paper sheet can be between sixty and one hundred and fifty pounds. While the lower end of that range may be a little too low, the upper end is probably more realistic. One hundred and fifty pound noncalendered paper is typically thirteen to fifteen mil thick and thereby generally too thick to pass through today's printers. However, that same weight paper when supercalendered has a reduced thickness of eleven to thirteen mil, which is thin enough to pass through most printers.

Supercalendering is a process that crushes or compresses the fibers of the sheet, thereby densifying the sheet. Because the sheet is densified, its fibers break or crumble easier along the desired lines. This provides for cleaner edge lines for the business cards.

Although supercalendering is a preferred method of making the paper fibers brittle, other processes are within the scope of this invention. One example is to apply radiation, such as ultraviolet or gamma energy, to the sheet. This can be over the entire sheet evenly or more focused along the desired separation lines. Another process is to apply a chemical to the sheet, such as a dilute acid coating. Again, this can be an even coating on the paper or a more focused application along the desired separation lines. It can be applied before, after or during the formation of the separation lines. For example, if the separation lines are formed by [scoring] *cutting*, the chemical may be deposited by application physically on the [scoring] knives or tools. Separation lines or the entire sheet can be created with stiffening and weakening materials, such as polymers. For example, the sheet can be coated with a very hard polymer, making the entire sheet more brittle, or just the separation lines coated with this brittle polymer.

At least one of the defining lines is a "substantial-cut" line 170, cut along its entire length, substantially but not all of the way through the paper 160; that is, cut from the top surface 174 of the paper approximately ninety percent the way through towards the bottom surface 178. This is shown in enlarged view in FIG. 6. A preferred embodiment has the substantial-cut line(s) extending 9.3 to 9.5 mil through a ten mil thick cardstock. Alternatively, they can extend between seventy and ninety-eight percent of the distance therethrough. The substantial-cut lines 170 can be formed by trimming wheels (rotary knives), by die cutting, laser scoring, or chemical or acid etching.

Figure 4:
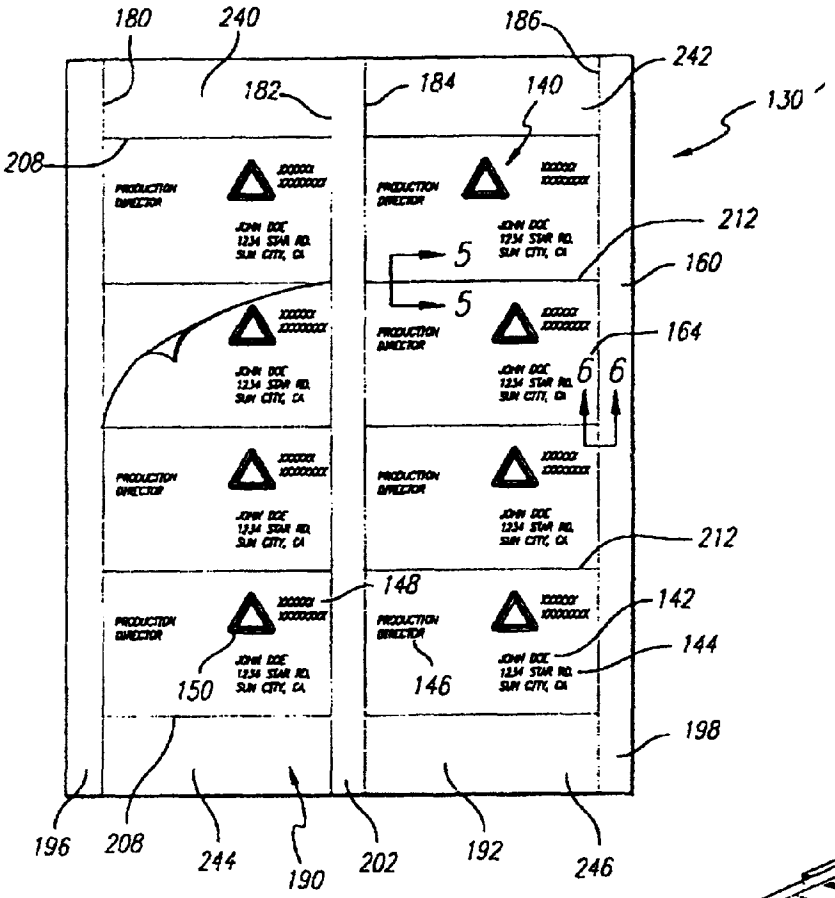
FIG. 4 is a front elevational view of one of the sheet assemblies of the present invention after a printing operation has been performed thereon.

A preferred pattern of defining lines is best shown in FIG. 4. It includes four parallel lengthwise lines 180, 182, 184, 186 extending the length of the sheet 160 and defining two parallel columns 190, 192 with waste strips 196, 198 at the outer edges and one center waste strip 202 between the columns. Spaced parallel widthwise lines 208, 212 extend the widths of the columns 190, 192, but not beyond them. As can be understood from FIG. 4, the lengthwise lines 180, 182, 184, 186 define the left and right edges of the sheet portions or cards 164 and the widthwise lines 208, 212 extend from the top and bottom edges thereof.

The lengthwise lines 180, 182, 184, 186 are each substantial-cut lines 170 are disclosed above. And the widthwise lines 208, 212 are preferably each through-cut lines, as best shown in FIG. 5 at 220, extending the entire distance through the sheet 160 along their entire lengths; that is, they are between and engage adjacent of the lengthwise lines. The through-cut lines 220 defines a perfectly smooth edge and thus are preferred over microperforated or substantial-cut widthwise lines. They also do not require any separating effort. Preferably, none of the through-cut lines 220 engages any edge of the sheet 160. If they did, the sheet 160 would be likely to be torn prematurely along the line. However, the pattern of substantial-cut and full-cut lines still provides the card stock sheet 160 with sufficient integrity to reliably pass through the printer without breaking apart.

After the sheet assembly 130 has passed through the printer 134 and the desired indicia 140 printed thereon, the individual cards (or printed media) 164 are separated by tearing or pulling along the four substantial-cut lines. Of course, no further separation is required on the through-cut lines. The side and center waste strips 196, 198, 202 can then be disposed of, as can the end margin strips 240, 244 at the ends of both of the columns.

As described above, relative to FIG. 6, the substantial-cut lines can be formed through one side (or face) of the paper 160. An alternative embodiment forms the substantial-cut line by "cutting" (or penetrating) the sheet from both sides, as shown in FIG. 7, by top cut or penetration 250 and bottom cut or penetration 254, leaving a thin center piece 258. These two penetration lines 250, 254 can be formed by trimming wheels (rotary knives), by die cutting, laser scoring, or chemical or acid etching. Preferably, they are formed with a scoring process.

If the paper 160 is a ten mil sheet, the top and bottom [scorings] *cuts* 250, 254 can each be two mil, leaving about sixty percent of the fibers intact in the center 258. Alternatively, the [scorings] *cuts* can even be 4.75 mil from both sides, leaving the center 258 only one-half mil thick (or any distance in between). The sheet 160 with this thin center 258 will have enough integrity not to fall apart depending on the kind of paper used and the configuration of the printer path. If the path is very convoluted, the one-half mil may not be enough, but for (printers with) straight paths it will likely be sufficient. Half mil thickness may also be sufficient where the paper 160 has long fibers, or where the paper has not been supercalendered or otherwise made brittle as discussed above.

[Scoring] *Cutting* on both sides tends to give the card (or printed media) when separated from the rest of the sheet a cleaner edge. One reason for this is that the separated fibers are in the middle of the sheet, not hanging out from either the top or bottom. When they are in the middle of the sheet 160 (that is, the middle of the thickness of the paper), they are likely to be less visible to the human eye.

Also, [scoring] *cutting* on both sides provides another level of control in the manufacturing process of this assembly. Paper 160 will vary in thickness depending upon whether it is sliced from one end of the paper roll, the middle or the other end. When [scoring] *cutting* on two sides, as depicted in FIG. 7, there is a better opportunity to adjust to variations in paper thickness, because two controls are thereby available.

A preferred technique is to [score] *cut* the top and bottom cuts 250, 254 simultaneously. However, it is also within the scope of the present invention to make the top and bottom [scores] *cuts* at different times. This [scoring] *cutting* can be by mechanical means, such as knives, by chemical means or by laser means. Additionally, these [score] *cut* lines can be oriented either horizontally or vertically relative to the direction in which the [scoring] *cutting* machine is running.

Figure 8:
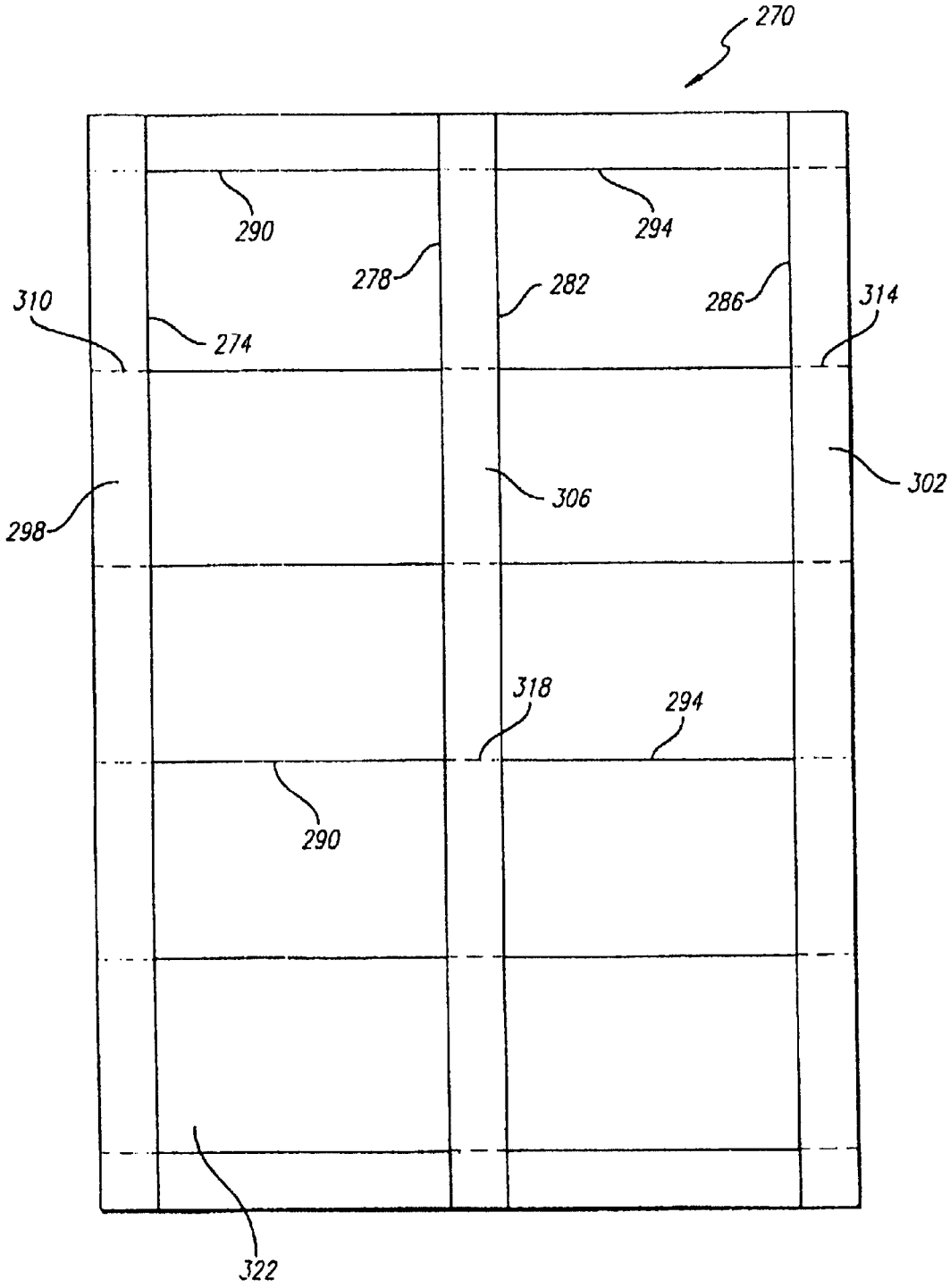
FIG. 8 is a front elevational view of an alternative sheet assembly before a printing operation.

Another sheet embodiment is shown in FIG. 8 at 270 having four lengthwise [scored] *cut* (not through-cut) lines 274, 278, 282, 286. Then the widthwise lines will have two through-cut lines 290, 294, not extending across the side margins 298, 302 or the center gutter 306.

An alternative arrangement provides short perforated lines 310, 314, 318 across both side margins 298, 302 and the center gutter 306. Although these short perforated lines provide for easier user access to the (ten) business cards 322 in the two columns, they also make the manufacture of the sheet 270 more difficult and thus may be eliminated if desired. Thus, the perfectly clean through-cut edges are provided on the top and bottom of each of the cards, and the left and right ends are defined by the [scored] *cut* lines. Alternatively, the positioning of the [score] *cut* lines and through-cut lines can be reversed, if desired.

From the foregoing detailed description, it will be evident that there are a number of changes, adaptations and modifications of the present invention which come within the province of those skilled in the art. However, it is intended that all such variations not departing from the spirit of the invention be considered as within the scope thereof as limited solely by the claims appended hereto.

What is claimed is:

[1. An assembly for passing through a printer or copier and separating out into individual printed cards, comprising:

print media;

first and second substantial-cut lines extending substantially the thickness of said print media and extending the length or width of said print media;

parallel and spaced weakened separation lines extending perpendicular to and between said substantial-cut lines on said print media;

wherein said separation lines and said substantial-cut lines define a column or row of card blanks; and wherein said print media is adapted to be passed through a printer or copier and desired indicia printed on said card blanks, which can then be separated from one another along said separation lines and said substantial-cut lines.]

[2. The assembly of claim 1 wherein said print media is a sheet, a roll or a fan fold.]

[3. The assembly of claim 1 wherein said print media is a sheet of paper.]

[4. The assembly of claim 3 wherein said sheet of paper is bonded or laminated with another paper, film or foil.]

[5. The assembly of claim 1 wherein at least one of said first and second substantial-cut lines is formed by penetrating through said print media through both first and second faces thereof by first and second penetrations.]

[6. The assembly of claim 5 wherein said first and second penetrations together penetrate through between 40 and 95 percent of the thickness of said print media.]

[7. The assembly of claim 5 wherein said first and second penetrations together penetrate through generally 80 percent of the thickness of said print media.]

[8. The assembly of claim 5 wherein said first and second penetrations are both made by scoring.]

[9. The assembly of claim 5 wherein said first and second penetrations are made simultaneously.]

[10. The assembly of claim 5 wherein said second penetration is made after said first penetration.]

[11. An assembly for passing through a printer or copier and then separating out into at least one printed media, comprising:

print media;

at least one substantial-cut line extending substantially the thickness of said print media; and at least one weakened separation line on said print media;

wherein said separation line and said substantial-cut line together define at least a substantial portion of a perimeter of at least one printable media; and wherein said print media is adapted to be passed through a printer or copier and desired indicia printed on said printable media, which can then be separated from the rest of said print media along said separation line and said substantial-cut line to form individual printed media.]

[12. The assembly of claim 11 wherein said print media is a sheet, a roll or a fan fold.]

[13. The assembly of claim 11 wherein said print media is a sheet of paper.]

[14. The assembly of claim 13 wherein said at least one weakened separation line is formed by scoring said sheet from opposing sides.]

[15. The assembly of claim 1 wherein said print media comprises a supercalendered sheet.]

[16. The assembly of claim 1 wherein said print media comprises a sheet treated with a chemical to make it more brittle.]

[17. The assembly of claim 1 wherein said print media comprises an irradiated sheet.]

[18. The assembly of claim 1 wherein said print media comprises an ultraviolet radiated sheet.]

[19. The assembly of claim 1 wherein said print media comprises a gamma radiated sheet.]

[20. The assembly of claim 1 wherein said substantial-cut lines extend about 90% through the thickness of said print media from a front surface towards a back surface thereof.]

[21. The assembly of claim 1 wherein said substantial-cut lines include lines cut from a top surface of said print media approximately 90% the way through towards a bottom surface thereof.]

[22. The assembly of claim 1 wherein said print media is a 10 mil thick card stock and said substantial-cut lines extend 9.3 to 9.5 mil through said card stock.]

[23. The assembly of claim 1 wherein said substantial-cut lines extend between 70% and 98% of the distance through the thickness of said print media from a front surface towards a back surface thereof.]

[24. The assembly of claim 1 wherein said substantial cut-lines comprise aligned top cut and bottom cut penetration lines leaving only a thin center piece of said print media therebetween.]

[25. The assembly of claim 11 wherein said print media comprises a supercalendered sheet.]

[26. The assembly of claim 11 wherein said print media comprises a sheet treated with a chemical to make it more brittle.]

[27. The assembly of claim 11 wherein said print media comprises an irradiated sheet.]

[28. The assembly of claim 11 wherein said print media comprises an ultraviolet radiated sheet.]

[29. The assembly of claim 11 wherein said print media comprises a gamma radiated sheet.]

[30. The assembly of claim 11 wherein said substantial-cut line extends about 90% through the thickness of the print media from a front surface towards a back surface thereof.]

[31. The assembly of claim 11 wherein said substantial-cut line includes a line cut from a top surface of said print media approximately 90% the way through towards a bottom surface.]

[32. The assembly of claim 11 wherein said print media is a 10 mil thick card stock and said substantial-cut lines extend 9.3 to 9.5 mil through said card stock.]

[33. The assembly of claim 11 wherein said substantial-cut line extends between 70% and 98% of the distance through the thickness of said print media from a front surface towards a back surface thereof.]

[34. The assembly of claim 11 wherein said substantial cut-line comprises aligned top cut and bottom cut penetration lines leaving only a thin center piece of said print media therebetween.]

*35. An assembly for passing through a printer or copier and then separating out into at least one printed media, comprising:*

*print media having an exposed front surface and an exposed back surface;*

*at least one substantial-cut line extending substantially a thickness of said print media;*

*wherein said at least one substantial-cut line includes a substantial-cut line which includes a first continuous cut line on said exposed front face and a second continuous cut line on said exposed back face and in registration with said first continuous cut line;*

*wherein said first and second continuous cut lines form therebetween a thin uncut intact print media portion; and*

*at least one weakened separation line on said print media;*

*wherein said separation line and said substantial-cut line together define at least a substantial portion of a perimeter of at least one printable media;*

*wherein said print media is adapted to be passed through a printer or copier and desired indicia printed on said printable media, which can then be separated from the rest of said print media along said separation line and said substantial-cut line and along and entirely through a thickness of said thin uncut intact print media portion to form individual printed media;*

*wherein entire back surfaces of each of said individual printed media are formed by said exposed back surface of said print media; and*

*wherein said thin uncut intact print media portion extends continuously in an unbroken manner along an entire edge of one of said at least one printable media.*

*36. The assembly of claim 35 wherein said at least one substantial-cut line includes a plurality of substantial-cut lines, said thin uncut intact print media portion includes a plurality of thin uncut intact print media portions, said at least one printable media includes a plurality of printable media, and said plurality of thin uncut intact print media portions collectively comprise the sole means for keeping said plurality of printable media together when said print media is passed through the printer or copier and the desired indicia are printed on said printable media.*

*37. The assembly of claim 35 wherein said at least one weakened separation line includes a plurality of weakened separation lines on said print media.*

*38. The assembly of claim 35 wherein said print media includes a sheet of paper bonded or laminated with another paper, film or foil.*

*39. The assembly of claim 35 further comprising additional substantial-cut lines on said print media, said additional substantial-cut lines include additional continuous cut lines on said exposed front surface and additional continuous cut lines on said exposed back surface and in registration with respective ones of said additional continuous cut lines on said exposed front surface.*

*40. The assembly of claim 35 wherein said first and second continuous cut lines together penetrate through between 40 and 95 percent of the thickness of said print media.*

*41. The assembly of claim 35 wherein said first and second continuous cut lines together penetrate through generally 80 percent of the thickness of said print media.*

*42. The assembly of claim 35 wherein the thickness of said thin uncut intact print media portion comprises approximately 30% of the thickness of said print media.*

*43. The assembly of claim 35 wherein the thickness of said thin uncut intact print media portion comprises approximately 5% of the thickness of said print media.*

*44. The assembly of claim 35 wherein said print media is a laminated construction.*

*45. The assembly of claim 35 wherein said print media has a constant thickness throughout its extent except where substantial-cut lines and weakened separation lines are.*

*46. The assembly of claim 35 wherein said first and second continuous cut lines are die cut lines.*

*47. The assembly of claim 35 wherein said print media is free of internal adhesive release surfaces.*

*48. The assembly of claim 35 wherein said print media includes a sheet of paper.*

*49. The assembly of claim 35 wherein said at least one substantial-cut line includes die-cut substantial-cut lines.*

*50. The assembly of claim 35 wherein said at least one printable media includes a first printable media and said print media includes a second printable media abutting said first printable media.*

*51. The assembly of claim 35 wherein said at least one printable media includes a first printable media and said print media includes a second printable media, and said substantial-cut line defines an edge of said second printable media.*

*52. The assembly of claim 35 wherein said printable media can be separated from the rest of said print media at least in part by tearing along said substantial-cut line and along and entirely through the thickness of said thin uncut intact print media portion to form said individual printed media.*

*53. The assembly of claim 35 wherein said at least one substantial-cut line engages an edge of said print media.*

*54. The assembly of claim 35 wherein a border portion of said print media encircles said at least one printable media along all four edges of said print media.*

*55. The assembly of claim 35 wherein said at least one weakened separation line includes at least one through-cut line.*

*56. The assembly of claim 35 further comprising a perforated line in said print media and extending between an end of said at least one weakened separation line and an adjacent edge of said print media.*

*57. An assembly for passing through a printer or copier and then separating out into at least one printed media, comprising:*

*print media having an exposed front surface and an exposed back surface;*

*at least one substantial-cut line extending substantially a thickness of said print media;*

*wherein said at least one substantial-cut line includes a substantial-cut line which includes a first continuous cut line on said exposed front face and a second continuous cut line on said exposed back face and in registration with said first continuous cut line;*

*wherein said first and second continuous cut lines form therebetween a thin uncut intact print media portion; and*

*at least one weakened separation line on said print media;*

*wherein said separation line and said substantial-cut line together define at least a substantial portion of a perimeter of at least one printable media;*

*wherein said print media is adapted to be passed through a printer or copier and desired indicia printed on said printable media, which can then be separated from the rest of said print media along said separation line and said substantial-cut line and along and entirely through a thickness of said thin uncut intact print media portion to form individual printed media;*

*wherein entire back surfaces of each of said individual printed media are formed by said exposed back surface of said print media; and*

*wherein said print media is free of perforation lines coinciding with said at least one substantial-cut line.*

*58. The assembly of claim 57 wherein said at least one substantial-cut line engages an edge of said print media.*

*59. The assembly of claim 57 wherein a border portion of said print media encircles said at least one printable media along all four edges of said print media.*

*60. The assembly of claim 57 wherein said at least one substantial-cut line includes a plurality of substantial-cut lines, said thin uncut intact print media portion includes a plurality of thin uncut intact print media portions, said at least one printable media includes a plurality of printable media, and said plurality of thin uncut intact print media portions collectively comprise the sole means for keeping said plurality of printable media together when said print media is passed through the printer or copier and the desired indicia are printed on said printable media.*

*61. The assembly of claim 57 wherein said at least one weakened separation line includes a plurality of weakened separation lines on said print media.*

*62. The assembly of claim 57 wherein said print media includes a sheet of paper bonded or laminated with another paper, film or foil.*

*63. The assembly of claim 57 further comprising additional substantial-cut lines on said print media, said additional substantial-cut lines include additional continuous cut lines on said exposed front surface and additional continuous cut lines on said exposed back surface and in registration with respective ones of said additional continuous cut lines on said exposed front surface.*

*64. The assembly of claim 57 wherein said first and second continuous cut lines together penetrate through between 40 and 95 percent of the thickness of said print media.*

*65. The assembly of claim 57 wherein said first and second continuous cut lines together penetrate through generally 80 percent of the thickness of said print media.*

*66. The assembly of claim 57 wherein the thickness of said thin uncut intact print media portion comprises approximately 30% of the thickness of said print media.*

*67. The assembly of claim 57 wherein the thickness of said thin uncut intact print media portion comprises approximately 5% of the thickness of said print media.*

*68. The assembly of claim 57 wherein said print media is a laminated construction.*

*69. The assembly of claim 57 wherein said print media has a constant thickness throughout its extent except where substantial-cut lines and weakened separation lines are.*

*70. The assembly of claim 57 wherein said first and second continuous cut lines are die-cut lines.*

*71. The assembly of claim 57 wherein said print media is free of internal adhesive release surfaces.*

*72. The assembly of claim 57 wherein said print media includes a sheet of paper.*

*73. The assembly of claim 57 wherein said at least one substantial-cut line includes die-cut substantial-cut lines.*

*74. The assembly of claim 57 wherein said at least one printable media includes a first printable media and said print media includes a second printable media abutting said first printable media.*

*75. The assembly of claim 57 wherein said at least one printable media includes a first printable media, said print media includes a second printable media, and said substantial-cut line defines an edge of said second printable media.*

*76. The assembly of claim 57 wherein said printable media can be separated from the rest of said print media at least in part by tearing along said substantial-cut line and along and entirely through the thickness of said thin uncut intact print media portion to form said individual printed media.*

*77. The assembly of claim 57 wherein said at least one weakened separation line includes at least one through-cut line.*

*78. An assembly for passing through a printer or copier and then separating out into at least one printed media, comprising: print media having an exposed back surface; at least one substantial-cut line extending substantially a thickness of said print media and thereby forming an adjacent thin uncut intact print media portion; wherein said thin uncut intact print media portion includes a portion of said exposed back surface; wherein said substantially the thickness is 70-98% of the thickness of said print media; and at least one weakened separation line on said print media; wherein said separation line and said substantial-cut line together define at least a substantial portion of a perimeter of at least one printable media; wherein said print media is adapted to be passed through a printer or copier and desired indicia printed on said printable media, which can then be separated from the rest of said print media along said separation line and said substantial-cut line and through said thin uncut intact print media portion to said exposed back surface to form individual printed media; wherein entire back surfaces of said printed media are formed by said exposed back surface of said print media; wherein said thin uncut intact print media portion extends along an entire edge of said printed media; and wherein said at least one substantial-cut line includes at least one die-cut substantial-cut line.*

*79. The assembly of claim 78 wherein said print media is a single layer construction.*

*80. The assembly of claim 78 wherein said print media is a laminated construction.*

*81. The assembly of claim 78 wherein said print media has an exposed front surface on which the desired indicia are printed.*

*82. The assembly of claim 78 wherein said at least one substantial-cut line extends between approximately 80 and 98 percent the way through said print media.*

*83. The assembly of claim 78 wherein said at least one substantial-cut line comprises two parallel substantial-cut lines and said at least one weakened separation line comprises two parallel weakened separation lines.*

*84. The assembly of claim 78 wherein said print media has a central body portion which includes said printable media and said print media has a waste frame portion surrounding said central body portion.*

*85. The assembly of claim 84 wherein said central body portion has a constant thickness throughout its extent except where substantial-cut lines and weakened separation lines are.*

*86. The assembly of claim 78 wherein said print media includes a sheet of paper.*

*87. The assembly of claim 78 wherein said print media has a constant thickness throughout its extent except where substantial-cut lines and weakened separation lines are.*

*88. The assembly of claim 78 wherein said at least one printable media includes a first printable media and said print media includes a second printable media abutting said first printable media.*

*89. The assembly of claim 78 wherein said at least one printable media includes a first printable media, said print media includes a second printable media, and said substantial-cut line defines an edge of said second printable media.*

*90. The assembly of claim 78 wherein said printable media can be separated from the rest of said print media at least in part by tearing along said substantial-cut line and along and entirely through a thickness of said thin uncut intact print media portion to form said individual printed media.*

*91. The assembly of claim 78 wherein said at least one weakened separation line includes at least one through-cut line.*

*92. The assembly of claim 78 further comprising a perforated line in said print media and extending between an end of said at least one weakened separation line and an adjacent edge of said print media.*

*93. The assembly of claim 78 wherein said print media is free of internal adhesive release surfaces.*

*94. An assembly for passing through a printer or copier and then separating out into at least one printed media, comprising:*

*print media;*

*at least one substantial-cut line extending substantially the thickness of said print media; and*

*at least one weakened separation line on said print media;*

*wherein said at least one weakened separation line and said at least one substantial-cut line together define at least a substantial portion of a perimeter of at least one printable media;*

*wherein said print media is adapted to be passed through a printer or copier and desired indicia printed on said printable media, which can then be separated from the rest of said print media along said at least one weakened separation line and said at least one substantial-cut line to form individual printed media;*

*wherein one of said at least one substantial-cut lines extends through a substantial portion of a thickness of said print media and thereby forms a thin uncut intact print media portion;*

*wherein said thin uncut intact print media portion extends continuously in an unbroken manner along an entire edge of one of said at least one printable media and is constructed, dimensioned and structurally capable of forming a printable media clean edge when said at least one printable media is manually separated through and along said thin uncut intact print media portion;*

*wherein said at least one substantial-cut line is at least one die-cut substantial-cut line; and*

*wherein said at least one substantial-cut line extends between approximately 70 and 98 percent the way through said print media.*

*95. The assembly of claim 94 wherein said print media is a sheet of paper.*

*96. The assembly of claim 94 wherein said print media is 10 mils thick print media.*

*97. The assembly of claim 94 wherein said at least one substantial-cut line extends between approximately 70 and 98 percent the way through said print media.*

*98. The assembly of claim 94 wherein said at least one substantial-cut line extends approximately 90 percent the way through said print media.*

*99. The assembly of claim 94 wherein said at least one substantial-cut line extends between approximately 93 and 95 percent the way through said print media.*

*100. The assembly of claim 94 wherein said at least one substantial-cut line extends between approximately 80 and 98 percent the way through said print media.*

*101. The assembly of claim 94 wherein said print media comprises a 10-20 mil thick sheet.*

*102. The assembly of claim 94 wherein said at least one weakened separation line comprises through-cut lines.*

*103. The assembly of claim 94 further comprising additional die-cut substantial-cut lines on said print media and parallel to said at least one substantial-cut line, and parallel and spaced additional weakened separation lines extending perpendicular to and between said additional die-cut substantial-cut lines.*

*104. The assembly of claim 103 wherein said at least one printable media defines a first column of card blanks, and said additional die-cut substantial-cut lines and said additional weakened separation lines define a second column of card blanks parallel to said first column.*

*105. The assembly of claim 94 wherein said print media comprises an approximately 8-12 mils thick print media.*

*106. The assembly of claim 94 wherein the printer or copier is an ink jet printer or a laser printer.*

*107. The assembly of claim 94 wherein said at least one die-cut substantial-cut line includes first and second die-cut substantial-cut lines on the same face of said print media.*

*108. The assembly of claim 94 wherein another one of said at least one substantial-cut lines extends through a substantial portion of a thickness of said print media and thereby forms another thin uncut intact print media portion which extends in an unbroken manner along another entire edge of said one of said at least one printable media.*

*109. The assembly of claim 94 wherein said printable media on front surfaces thereof are free of any visible printed indicia.*

*110. The assembly of claim 94 wherein said print media is free of internal adhesive release surfaces.*

*111. An assembly for passing through a printer or copier and then separating out into at least one printed media, comprising:*

*print media;*

*at least one substantial-cut line extending substantially the thickness of said print media; and*

*at least one weakened separation line on said print media;*

*wherein said at least one weakened separation line and said at least one substantial-cut line together define at*

*least a substantial portion of a perimeter of at least one printable media;*

*wherein said print media is adapted to be passed through a printer or copier and desired indicia printed on said printable media, which can then be separated from the rest of said print media along said at least one weakened separation line and said at least one substantial-cut line to form individual printed media;*

*wherein one of said at least one substantial-cut lines extends through a substantial portion of a thickness of said print media and thereby forms a thin uncut intact print media portion;*

*wherein said thin uncut intact print media portion extends continuously in an unbroken manner along an entire edge of one of said at least one printable media;*

*wherein said at least one substantial-cut line is at least one die-cut substantial-cut line;*

*wherein said at least one substantial-cut line extends between approximately 70 and 98 percent the way through said print media;*

*wherein the back surface of said print media defines the entire back surfaces of all of said at least one printable media; and*

*wherein said at least one printable media has no cut lines on a front face thereof.*

*112. The assembly of claim 111 wherein said print media is a sheet of paper.*

*113. The assembly of claim 111 wherein said at least one substantial-cut line extends between approximately 70 and 98 percent the way through said print media.*

*114. The assembly of claim 111 wherein said at least one substantial-cut line extends approximately 90 percent the way through said print media.*

*115. The assembly of claim 111 wherein said at least one substantial-cut line extends between approximately 93 and 95 percent the way through said print media.*

*116. The assembly of claim 111 wherein said at least one substantial-cut line extends between approximately 80 and 98 percent the way through said print media.*

*117. The assembly of claim 111 wherein said print media comprises a 10-20 mil thick sheet.*

*118. The assembly of claim 111 wherein said print media is a single-layer printable sheet.*

*119. The assembly of claim 111 wherein said at least one weakened separation line comprises through-cut lines.*

*120. The assembly of claim 111 wherein print media portions at opposite ends of said at least one printable media define waste portions.*

*121. The assembly of claim 111 further comprising additional die-cut substantial-cut lines on said print media and parallel to said at least one substantial-cut line, and parallel and spaced additional weakened separation lines extending perpendicular to and between said additional die-cut substantial-cut lines.*

*122. The assembly of claim 121 wherein said at least one printable media defines a first column of card blanks, and said additional die-cut substantial-cut lines and said additional weakened separation lines define a second column of card blanks parallel to said first column.*

*123. The assembly of claim 111 wherein said print media comprises an approximately 8-12 mils thick print media.*

*124. The assembly of claim 111 wherein the printer or copier is an ink jet printer or a laser printer.*

*125. The assembly of claim 111 wherein said at least one die-cut substantial-cut line includes first and second die-cut substantial-cut lines on the same face of said print media.*

*126. The assembly of claim 111 wherein said printable media on front surfaces thereof are free of any visible printed indicia.*

*127. The assembly of claim 111 wherein said print media is free of internal adhesive release surfaces.*

*128. An assembly for passing through a printer or copier and separating out into individual printed cards, comprising:*

*print media;*

*first and second substantial-cut lines extending substantially the thickness of said print media and extending the length or width of said print media; and*

*parallel and spaced weakened separation lines extending perpendicular to and between said substantial-cut lines on said print media;*

*wherein said separation lines and said substantial-cut lines define a column or row of card blanks;*

*wherein said print media is adapted to be passed through a printer or copier and desired indicia printed on said card blanks, which can then be separated from one another along said separation lines and said substantial-cut lines;*

*wherein said print media has no perforation lines on an opposite side thereof coinciding with said substantial-cut lines;*

*wherein said substantial-cut lines are die-cut substantial-cut lines;*

*wherein said substantial-cut lines extend between approximately 70 and 98 percent the way through said print media;*

*wherein the back surface of said print media defines the entire back surfaces of all of said card blanks; and*

*wherein all of said card blanks have no cut lines on front faces thereof.*

*129. The assembly of claim 128 wherein said print media is 10 mils thick print media.*

*130. The assembly of claim 128 wherein said substantial-cut lines extend approximately 90 percent the way through said print media.*

*131. The assembly of claim 128 wherein said substantial-cut lines extend between approximately 93 and 95 percent the way through said print media.*

*132. The assembly of claim 128 wherein said substantial-cut lines extend between approximately 80 and 98 percent the way through said print media.*

*133. The assembly of claim 128 wherein said print media comprises a 10-20 mil thick print media.*

*134. The assembly of claim 128 wherein said print media is a single-layer printable sheet.*

*135. The assembly of claim 128 wherein said weakened separation lines comprise through-cut lines.*

*136. The assembly of claim 128 further comprising third and fourth die-cut substantial-cut lines on said print media and to said first and second die-cut substantial-cut lines, and parallel and spaced additional weakened separation lines extending perpendicular to and between said third and fourth die-cut substantial-cut lines.*

*137. The assembly of claim 128 wherein said column or row of card blanks defines a first column of card blanks, and said third and fourth die-cut substantial-cut lines and said additional weakened separation lines define a second column of card blanks parallel to said first column.*

*138. The assembly of claim 128 wherein said print media comprises an approximately 8-12 mil thick media sheet.*

*139. The assembly of claim 128 wherein the printer or copier is an ink jet printer or a laser printer.*

*140. The assembly of claim 128 wherein said substantial-cut lines are both on the same face of said print media.*

*141. The assembly of claim 128 wherein said card blanks on front surfaces thereof are free of any visible printed indicia.*

*142. The assembly of claim 128 wherein said print media is free of internal adhesive release surfaces.*

*143. An assembly for passing through a printer or copier and separating out into individual printed cards, comprising:*

*print media;*

*first and second substantial-cut lines extending substantially the thickness of said print media and extending the length or width of said print media;*

*parallel and spaced weakened separation lines extending perpendicular to and between said substantial-cut lines on said print media;*

*wherein said separation lines and said substantial-cut lines define a column or row of card blanks;*

*wherein said print media is adapted to be passed through a printer or copier and desired indicia printed on said card blanks, which can then be separated from one another along said separation lines and said substantial-cut lines;*

*wherein said print media has no weakened lines penetrating on an opposite side thereof and coinciding with said substantial-cut lines;*

*wherein said substantial-cut lines are die-cut substantial-cut lines;*

*wherein said substantial-cut lines extend between approximately 70 and 98 percent the way through said print media;*

*wherein the back surface of said print media defines the entire back surfaces of all of said card blanks; and*

*wherein all of said card blanks have no cut lines on front faces thereof.*

*144. The assembly of claim 143 wherein said print media is 10 mils thick print media.*

*145. The assembly of claim 143 wherein said substantial-cut lines extend approximately 90 percent the way through said print media.*

*146. The assembly of claim 143 wherein said substantial-cut lines extend between approximately 93 and 95 percent the way through said print media.*

*147. The assembly of claim 143 wherein said substantial-cut lines extend between approximately 80 and 98 percent the way through said print media.*

*148. The assembly of claim 143 wherein said print media comprises a 10-20 mil thick sheet.*

*149. The assembly of claim 143 wherein said print media is a single-layer print media.*

*150. The assembly of claim 143 wherein said weakened separation lines comprise through-cut lines.*

*151. The assembly of claim 143 further comprising third and fourth die-cut substantial-cut lines on said print media and to said first and second substantial-cut lines, and parallel and spaced additional weakened separation lines extending perpendicular to and between said third and fourth substantial-cut lines.*

*152. The assembly of claim 151 wherein said column or row of card blanks defines a first column of card blanks, and said third and fourth die-cut substantial-cut lines and said additional weakened separation lines define a second column of card blanks parallel to said first column.*

*153. The assembly of claim 143 wherein said print media comprises an approximately 8-12 mil thick print media.*

*154. The assembly of claim 143 wherein the printer or copier is an ink jet printer or a laser printer.*

*155. The assembly of claim 143 wherein said substantial-cut lines are both on the same face of said print media.*

*156. The assembly of claim 143 wherein said card blanks on front surfaces thereof are free of any visible printed indicia.*

*157. The assembly of claim 143 wherein said print media is free of internal adhesive release surfaces.*

*158. An assembly for passing through a printer or copier and separating out into individual printed cards, comprising:*

*print media;*

*first and second substantial-cut lines extending substantially the thickness of said print media and extending the length or width of said print media; and*

*parallel and spaced weakened separation lines extending perpendicular to and between said substantial-cut lines on said print media;*

*wherein said separation lines and said substantial-cut lines define a column or row of card blanks;*

*wherein said print media is adapted to be passed through a printer or copier and desired indicia printed on said card blanks, which can then be separated from one another along said separation lines and said substantial-cut lines;*

*wherein said first substantial-cut line includes a first continuous cut line on a top face of said print media and a second continuous cut line on a bottom face of said print media and in registration with said first continuous cut line;*

*wherein said first and second continuous cut lines form therebetween a thin uncut intact print media portion;*

*wherein said thin uncut intact print media portion extends continuously in an unbroken manner along an entire edge of one of said card blanks and is constructed and dimensioned to form a card blank clean edge when said one of said card blanks is manually separated through and along said thin uncut intact print media portion; and*

*wherein said substantial-cut lines are die-cut substantial-cut lines.*

*159. The assembly of claim 158 wherein said first and second continuous cut lines together penetrate through between 40 and 95 percent of the thickness of said print media.*

*160. The assembly of claim 158 wherein said first and second continuous cut lines together penetrate through generally 80 percent of the thickness of said print media.*

*161. The assembly of claim 158 wherein said print media comprises a supercalendered sheet.*

*162. The assembly of claim 158 wherein said separation lines comprise through-cut lines cut all of the way through said print media and extending between and engaging at opposite ends thereof said first and second substantial-cut lines.*

*163. The assembly of claim 158 wherein said column or row of card blanks defines a first column of card blanks, and further comprising third and fourth die-cut substantial-cut lines in said print media and parallel and spaced additional separation lines extending there between and defining a second column of card blanks, parallel to said first column.*

*164. The assembly of claim 163 wherein said third die-cut substantial-cut line includes a third continuous die-cut cut line on said top face of said print media and a fourth continuous die-cut cut line on said bottom face of said print media and in registration with said third continuous die-cut cut line.*

*165. The assembly of claim 158 wherein said print media is 10 mils thick print media.*

*166. The assembly of claim 158 wherein said print media is 10-20 mils thick.*

*167. The assembly of claim 158 wherein said weakened separation lines comprise through-cut lines.*

*168. The assembly of claim 158 further comprising third and fourth die-cut substantial-cut lines on said print media and parallel to said first and second substantial-cut lines, and parallel and spaced additional weakened separation lines extending perpendicular to and between said third and fourth die-cut substantial-cut lines.*

*169. The assembly of claim 168 wherein said column or row of card blanks defines a first column of card blanks, and said third and fourth die-cut substantial-cut lines and said additional weakened separation lines define a second column of card blanks parallel to said first column.*

*170. The assembly of claim 158 wherein said print media comprises an approximately 8-12 mil thick print media.*

*171. The assembly of claim 158 wherein the printer or copier is an ink jet printer or a laser printer.*

*172. The assembly of claim 158 wherein the thickness of said thin uncut intact print media portion comprises approximately 30% of the thickness of said print media.*

*173. The assembly of claim 158 wherein the thickness of said thin uncut intact print media comprises approximately 5% of the thickness of said print media.*

*174. The assembly of claim 158 wherein said card blanks on front surfaces thereof are free of any visible printed indicia.*

*175. The assembly of claim 158 wherein said print media is free of internal adhesive release surfaces.*

*176. An assembly for passing through a printer or copier and separating out into individual printed cards, comprising:*

*print media;*

*first and second substantial-cut lines extending substantially the thickness of said print media and extending the length or width of said print media; and*

*parallel and spaced weakened separation lines extending perpendicular to and between said substantial-cut lines on said print media;*

*wherein said separation lines and said substantial-cut lines define a column or row of card blanks;*

*wherein said print media is adapted to be passed through a printer or copier and desired indicia printed on said card blanks, which can then be separated from one another along said separation lines and said substantial-cut lines;*

*wherein said first substantial-cut line includes a first continuous cut line on a top face of said print media and a second continuous cut line on a bottom face of said print media and in registration with said first continuous cut line;*

*wherein said first and second continuous cut lines form therebetween a thin uncut intact print media portion;*

*wherein said thin uncut intact print media portion extends continuously in an unbroken manner along an entire edge of one of said card blanks;*

*wherein said substantial-cut lines are die-cut substantial-cut lines;*

*wherein the back surface of said print media defines the entire back surfaces of all of said card blanks; and*

*wherein all of said card blanks have no cut lines on a front face thereof.*

*177. The assembly of claim 176 wherein said first and second continuous cut lines together penetrate through between 40 and 95 percent of the thickness of said print media.*

*178. The assembly of claim 176 wherein said print media comprises a supercalendered sheet.*

*179. The assembly of claim 176 wherein said print media is 10 mils thick print media.*

*180. The assembly of claim 176 wherein said print media is 10-20 mils thick.*

*181. The assembly of claim 176 wherein said weakened separation lines comprise through-cut lines.*

*182. The assembly of claim 176 further comprising third and fourth die-cut substantial-cut lines on said print media and parallel to said first and second die-cut substantial-cut lines, and parallel and spaced additional weakened separation lines extending perpendicular to and between said third and fourth die-cut substantial-cut lines.*

*183. The assembly of claim 182 wherein said column or row of card blanks defines a first column of card blanks, and said third and fourth die-cut substantial-cut lines and said additional weakened separation lines define a second column of card blanks parallel to said first column.*

*184. The assembly of claim 176 wherein said print media comprises an approximately 8-12 mil thick print media.*

*185. The assembly of claim 176 wherein the printer or copier is an ink jet printer or a laser printer.*

*186. The assembly of claim 176 wherein the thickness of said thin uncut intact print media portion comprises approximately 30% of the thickness of said print media.*

*187. The assembly of claim 176 wherein the thickness of said thin uncut intact print media portion comprises approximately 5% of the thickness of said print media.*

*188. The assembly of claim 176 wherein said card blanks on front surfaces thereof are free of any visible printed indicia.*

*189. The assembly of claim 176 wherein said print media is free of internal adhesive release surfaces.*

*190. An assembly for passing through a printer or copier and then separating out into at least one printed media, comprising:*

*print media;*

*at least one substantial-cut line extending substantially the thickness of said print media; and*

*at least one weakened separation line on said print media;*

*wherein said at least one weakened separation line and said at least one substantial-cut line together define at least a substantial portion of a perimeter of at least one printable media;*

*wherein said print media is adapted to be passed through a printer or copier and desired indicia printed on said printable media, which can then be separated from the rest of said print media along said at least one weakened separation line and said at least one substantial-cut line to form individual printed media;*

*wherein said print media has no weakened lines penetrating on an opposite side thereof and coinciding with said at least one substantial-cut line;*

*wherein said at least one substantial-cut line is at least one die-cut substantial-cut line;*

*wherein said at least one substantial-cut line extends between approximately 70 and 98 percent the way through said print media;*

*wherein the back surface of said print media defines the entire back surfaces of all of said printable media; and*

*wherein said at least one printable media has no cut lines on a front face thereof.*

*191. The assembly of claim 190 wherein said print media is a sheet of paper.*

*192. The assembly of claim 190 wherein said print media is 10 mils thick print media.*

*193. The assembly of claim 190 wherein said at least one substantial-cut line extends approximately 90 percent the way through said print media.*

*194. The assembly of claim 190 wherein said at least one substantial-cut line extends between approximately 93 and 95 percent the way through said print media.*

*195. The assembly of claim 190 wherein said at least one substantial-cut line extends between approximately 80 and 98 percent the way through said print media.*

*196. The assembly of claim 190 wherein said print media comprises a 10-20 mil thick sheet.*

*197. The assembly of claim 190 wherein said at least one weakened separation line comprises through-cut lines.*

*198. The assembly of claim 190 further comprising additional die-cut substantial-cut lines on said print media and parallel to said at least one substantial-cut line, and parallel and spaced additional weakened separation lines extending perpendicular to and between said additional die-cut substantial-cut lines.*

*199. The assembly of claim 198 wherein said at least one printable media defines a first column of card blanks, and said additional die-cut substantial-cut lines and said additional weakened separation lines define a second column of card blanks, parallel to said first column.*

*200. The assembly of claim 190 wherein said print media comprises an approximately 8-12 mil thick print media.*

*201. The assembly of claim 190 wherein the printer or copier is an ink jet printer or a laser printer.*

*202. The assembly of claim 190 wherein said at least one substantial-cut line includes first and second substantial-cut lines on the same face of said print media.*

*203. The assembly of claim 190 wherein said printable media on front surfaces thereof are free of any visible printed indicia.*

*204. The assembly of claim 190 wherein said print media is free of internal adhesive release surfaces.*

*205. An assembly for passing through a printer or copier and then separating out into at least one printed media, comprising:*

*print media;*

*at least one substantial-cut line extending substantially the thickness of said print media; and*

*at least one weakened separation line on said print media;*

*wherein said at least one weakened separation line and said at least one substantial-cut line together define at least a substantial portion of a perimeter of at least one printable media;*

*wherein said print media is adapted to be passed through a printer or copier and desired indicia printed on said printable media, which can then be separated from the rest of said print media along said at least one weakened separation line and said at least one substantial-cut line to form individual printed media;*

*wherein said at least one substantial-cut line includes a substantial-cut line which includes a first continuous cut line on a top face of said print media and a second continuous cut line on a bottom face of said print media and in registration with said first continuous cut line;*

*wherein said first and second continuous cut lines form there between a thin uncut intact print media portion;*

*wherein said thin uncut intact print media portion extends continuously along an entire edge of one of said at least one printable media;*

*wherein said at least one substantial-cut line comprises at least one die-cut substantial-cut line; and*

*wherein said print media has no internal release surface.*

*206. The assembly of claim 205 wherein said at least one substantial-cut line extends approximately 90 percent the way through said print media.*

*207. The assembly of claim 205 wherein said at least one substantial-cut line extends between approximately 93 and 95 percent the way through said print media.*

*208. The assembly of claim 205 wherein said at least one substantial-cut line extends between approximately 80 and 98 percent the way through said print media.*

*209. The assembly of claim 205 wherein the individual printed cards comprise printed rectangular business cards.*

*210. The assembly of claim 205 wherein said at least one weakened separation line comprises through-cut lines.*

*211. The assembly of claim 205 further comprising additional die-cut substantial-cut lines on said print media and parallel to said at least one substantial-cut line, and parallel and spaced additional weakened separation lines extending perpendicular to and between said additional die-cut substantial-cut lines.*

*212. The assembly of claim 211 wherein said at least one printable media defines a first column of card blanks, and said additional die-cut substantial-cut lines and said additional weakened separation lines define a second column of card blanks, parallel to said first column.*

*213. The assembly of claim 212 wherein said additional die-cut substantial-cut lines include additional continuous cut lines on said top face of said print media and additional continuous cut lines on said bottom face of said print media in registration with respective ones of said additional continuous cut lines on said top face.*

*214. The assembly of claim 205 wherein said first and second continuous cut lines together penetrate through between 40 and 95 percent of the thickness of said print media.*

*215. The assembly of claim 205 wherein said first and second continuous cut lines together penetrate through generally 80 percent of the thickness of said print media.*

*216. The assembly of claim 205 wherein the thickness of said thin uncut intact print media portion comprises approximately 30% of the thickness of said print media.*

*217. The assembly of claim 205 wherein the thickness of said thin uncut intact print media portion comprises approximately 5% of the thickness of said print media.*

*218. The assembly of claim 205 wherein said print media is a laminated construction.*

*219. The assembly of claim 205 wherein said printable media on front surfaces thereof are free of any visible printed indicia.*

* * * * *